US010670762B2

(12) United States Patent
Ang et al.

(10) Patent No.: US 10,670,762 B2
(45) Date of Patent: Jun. 2, 2020

(54) PRESSURE BALANCED TRANSDUCER ASSEMBLY AND MEASUREMENT TOOL

(71) Applicant: Halliburton Energy Services, Inc., Houston, TX (US)

(72) Inventors: Junhuan Ang, Singapore (SG); Atiqur Rahman, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 366 days.

(21) Appl. No.: 15/576,369

(22) PCT Filed: Jul. 2, 2015

(86) PCT No.: PCT/CA2015/050615
§ 371 (c)(1),
(2) Date: Nov. 22, 2017

(87) PCT Pub. No.: WO2017/000052
PCT Pub. Date: Jan. 5, 2017

(65) Prior Publication Data
US 2018/0149013 A1 May 31, 2018

(51) Int. Cl.
*G01V 1/52* (2006.01)
*G01L 19/14* (2006.01)
*G01L 7/16* (2006.01)

(52) U.S. Cl.
CPC .............. *G01V 1/52* (2013.01); *G01L 19/147* (2013.01); *G01L 7/16* (2013.01); *G01V 2001/526* (2013.01)

(58) Field of Classification Search
CPC .. G01V 1/52; G01V 2001/526; G01L 19/147; G01L 7/16
See application file for complete search history.

(56) References Cited

U.S. PATENT DOCUMENTS 3,472,077 A    10/1969   Bucalo
4,001,765 A   *   1/1977   Sims .................. G01S 1/72
                                                                                 367/172

(Continued)

FOREIGN PATENT DOCUMENTS

CA    2842942 A1   2/2013
CN    2281414      5/1998
(Continued)

OTHER PUBLICATIONS

Qi, Bing et al., "Fiber Optic Pressure and Temperature Sensors for Oil Down Hole Application", Proceedings of SPIE vol. 4578, pp. 182-190, 2002.

*Primary Examiner* — Ian J Lobo
(74) *Attorney, Agent, or Firm* — Terrence N. Kuharchuk; Parlee McLaws LLP; Craig W. Roddy (57) ABSTRACT

A transducer assembly including a rigid transducer housing. The transducer housing has an interior space and defines a transducer socket and a pressure balancing cylinder. A transducer device is fixedly mounted within the transducer socket. A pressure balancing piston is reciprocably mounted within the pressure balancing cylinder. A pressure balancing fluid and an electronics assembly are contained within the interior space. The electronics assembly is operatively connected with the transducer device. A measurement tool including a tool body and one or more transducer assemblies. The tool body defines one or more pressure balancing body passages extending between mounting pockets in the tool body. The transducer housings define one or more pressure balancing housing passages extending between the interior space and the exterior of the transducer housings. At least some pressure balancing body passages and some pressure balancing housing passages are in pressure communication with each other.

20 Claims, 5 Drawing Sheets

(56) References Cited

U.S. PATENT DOCUMENTS

| | | |
|---|---|---|
| 4,027,481 A | 6/1977 | Hunt |
| 4,237,901 A * | 12/1980 | Taenzer ............... A61B 8/4281 |
| | | 600/443 |
| 4,628,495 A | 12/1986 | Peppers et al. |
| 4,928,031 A | 5/1990 | Linyaev et al. |
| 5,644,186 A | 7/1997 | Birchak et al. |
| 5,982,708 A | 11/1999 | Pearce |
| 5,987,385 A | 11/1999 | Varsamis et al. |
| 6,213,250 B1 | 4/2001 | Wisniewski et al. |
| 6,220,371 B1 | 4/2001 | Sharma et al. |
| 7,047,816 B2 | 5/2006 | Jones et al. |
| 7,290,604 B2 | 11/2007 | Evans |
| 7,364,007 B2 | 4/2008 | Garcia-Osuna et al. |
| 7,460,435 B2 | 12/2008 | Garcia-Osuna et al. |
| 7,913,806 B2 | 3/2011 | Pabon et al. |
| 8,689,620 B2 | 4/2014 | Ratcliffe et al. |
| 2005/0150713 A1 | 7/2005 | Garcia-Osuna et al. |
| 2007/0056771 A1 | 3/2007 | Gopalan et al. |
| 2008/0067754 A1 * | 3/2008 | Schroeder ............... F16J 15/006 |
| | | 277/437 |
| 2012/0324993 A1 | 12/2012 | Nakajima et al. |
| 2014/0265732 A1 | 9/2014 | Dallas et al. |

FOREIGN PATENT DOCUMENTS

| | | |
|---|---|---|
| CN | 101349152 A | 1/2009 |
| CN | 103147747 A | 6/2013 |
| JP | H11336464 A | 12/1999 |
| WO | 2000019242 | 4/2000 |
| WO | 2002059459 A1 | 8/2002 |

\* cited by examiner

PRESSURE BALANCED TRANSDUCER ASSEMBLY AND MEASUREMENT TOOL

TECHNICAL FIELD

A pressure balanced transducer assembly and a pressure balanced measurement tool comprising one or more transducer assemblies.

BACKGROUND OF THE INVENTION

Data logging may be performed using a transducer assembly and/or a measurement tool which includes one or more transducer assemblies. Pressure differences within or amongst transducer devices in a transducer assembly and/or in a measurement tool including one or more transducer assemblies may result in variations in the data obtained from the transducer devices.

BRIEF DESCRIPTION OF DRAWINGS

Embodiments of the invention will now be described with reference to the accompanying drawings, in which.

DETAILED DESCRIPTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at a transducer assembly and at a measurement tool which comprises one or more transducer assemblies. The transducer assembly and/or the measurement tool may be configured to be inserted and/or contained and/or used within a borehole.

The transducer assembly and/or the measurement tool may be used for data logging within a borehole. The measurement tool may be a logging tool for use in data logging within a borehole. The transducer assembly and/or the measurement tool as described herein may be deployed in a borehole on a pipe string, a tubing string, a coiled tubing, a wireline, a slickline, or in any other suitable manner.

The transducer assembly may comprise any number of transducer devices. The transducer assembly may comprise one transducer device or may comprise any number of a plurality of transducer devices.

The measurement tool may comprise any number of transducer assemblies. The measurement tool may comprise one transducer assembly or may comprise any number of a plurality of transducer assemblies.

The transducer assembly may provide pressure balancing for one or more transducer devices which are included in the transducer assembly. This pressure balancing may comprise managing the extent to which different portions or areas of a transducer device are exposed to different pressures, and/or managing the extent to which a plurality of transducer devices in the transducer assembly are exposed to different pressures.

The measurement tool may provide pressure balancing for one or more transducer assemblies which are included in the measurement tool. This pressure balancing may comprise managing the extent to which transducer devices in a plurality of transducer assemblies are exposed to different pressures.

The transducer assembly may comprise a transducer housing and a first transducer device mounted on or within the transducer housing.

The transducer housing may comprise any structure or combination of structures which is suitable for supporting the first transducer device, may be of any shape, and may be constructed of any material which is suitable for performing the functions of the transducer housing. The transducer housing may be a rigid transducer housing, so that the transducer housing does not deform significantly or at all when subjected to pressure. The transducer housing may be a unitary transducer housing or may comprise a plurality of transducer housing components.

The transducer housing may have an interior space and an exterior. The interior space may be defined by the transducer housing.

The transducer housing may have a first transducer socket. The first transducer socket may be defined by the transducer housing. The first transducer socket may be in pressure communication with the interior space and/or with the exterior of the transducer housing.

The first transducer device may comprise any type of sensor, transmitter, receiver, transceiver or similar structure, device or apparatus which may be used to sense, receive, and/or transmit data, information and/or signals.

The first transducer device may comprise an acoustic transmitter, an acoustic receiver, or an acoustic transceiver. The first transducer device may be used to determine properties of materials based upon the transmission of acoustic energy through the materials. The first transducer device may comprise a component of an acoustic logging apparatus or system.

The first transducer device may be mounted within the first transducer socket. The first transducer device may be mounted within the first transducer socket in any suitable manner. The first transducer device may be fixedly mounted within the first transducer socket so that the first transducer device does not move significantly or at all relative to the transducer housing when mounted within the first transducer socket. The first transducer device may be fixedly mounted within the first transducer socket in any suitable manner, and may be fixedly mounted within the first transducer socket either permanently or removably. The first transducer device may be fixedly mounted within the first transducer socket by being secured between shoulders in the first transducer socket and/or between suitable retaining devices.

The first transducer device may be sealingly mounted within the first transducer socket. The first transducer device may be sealingly mounted within the first transducer socket in any suitable manner. The transducer assembly may comprise a first transducer seal between the first transducer device and the transducer housing.

The first transducer device may have an interior side and an exterior side. The first transducer device may be mounted within the first transducer socket so that the interior side is adjacent to the interior space of the transducer housing and so that the exterior side is adjacent to the exterior of the transducer housing. The interior side of the first transducer device may be exposed to an interior space pressure within the interior space of the transducer housing. The exterior side of the first transducer device may be exposed to an exterior pressure at the exterior of the transducer housing.

The transducer assembly may comprise an assembly pressure balancing device for providing pressure balancing between the interior space of the transducer housing and the exterior of the transducer housing. The assembly pressure balancing device may be comprised of any structure, device and/or apparatus or any combination of structures, devices and/or apparatus which is capable of providing the pressure balancing. As a non-limiting example, the assembly pressure balancing device may comprise one or more devices which are capable of transmitting pressure without allowing fluid to pass between the interior space and the exterior of the transducer housing, such as one or more flexible diaphragms and/or one or more pressure balancing pistons.

The transducer housing may have a first pressure balancing cylinder. The first pressure balancing cylinder may be defined by the transducer housing. The first pressure balancing cylinder may be in pressure communication with the interior space and/or with the exterior of the transducer housing.

The transducer assembly may comprise a first pressure balancing piston which is reciprocably mounted within the first pressure balancing cylinder. The first pressure balancing piston may be reciprocably mounted within the first pressure balancing cylinder in any manner which enables the first pressure balancing piston to reciprocate within the first pressure balancing cylinder while being retained within the first pressure balancing cylinder. The first pressure balancing piston may be retained within the first pressure balancing cylinder between shoulders in the first transducer socket and/or between suitable retaining devices.

The first pressure balancing piston may have an interior side and an exterior side. The first pressure balancing piston may be reciprocably mounted within the first pressure balancing cylinder so that the interior side of the first pressure balancing piston is exposed to the interior space pressure within the interior space of the transducer housing, and so that the exterior side of the first transducer device is exposed to an exterior pressure at the exterior of the transducer housing, with the result that the first pressure balancing piston reciprocates in response to pressure differences between the interior space and the exterior of the transducer housing.

The first pressure balancing piston may be sealingly mounted within the first pressure balancing cylinder. The first pressure balancing piston may be sealingly mounted within the first pressure balancing cylinder in any suitable manner. The transducer assembly may comprise a first piston seal between the first pressure balancing piston and the transducer housing. The first piston seal may comprise one or more seal elements.

In some circumstances, it may be advantageous to provide for a pressure differential between the interior space of the transducer housing and the exterior of the transducer housing. As a result, the first pressure balancing piston may be biased within the first pressure balancing cylinder to provide for such a pressure differential. The first pressure balancing piston may be biased within the first pressure balancing cylinder by using any suitable biasing device including, as a non-limiting example, a spring.

The assembly pressure balancing device may comprise the first pressure balancing cylinder and the first pressure balancing piston.

The transducer assembly may comprise an electronics assembly. The electronics assembly may comprise one or more electronic components which are capable of interacting with transducers, including as non-limiting examples, processors, controllers, batteries, memories, etc. The electronics assembly may be contained within the interior space of the transducer housing.

The electronics assembly may be operatively connected with the first transducer device in order to enable the electronics assembly to communicate with the first transducer device. The electronics assembly may be operatively connected with the first transducer device in any suitable manner including, as non-limiting examples, with a wired electrical connection or with a wireless connection.

The transducer assembly may comprise one or more electrical connectors at the exterior of the transducer housing. The one or more electrical connectors may be configured at the exterior of the transducer housing in any manner which facilitates connection with the electrical connectors from the exterior of the transducer housing. As non-limiting examples, the one or more electrical connectors may be on or within the transducer housing, or may extend from the transducer housing.

The one or more electrical connectors may be operatively connected with the electronics assembly in order to facilitate communication between the electronics assembly and the exterior of the transducer housing. The one or more electrical connectors may be operatively connected with the electronics device in any suitable manner including, as non-limiting examples, with a wired electrical connection or with a wireless connection.

The transducer assembly may comprise a pressure balancing fluid which is contained within the interior space of the transducer housing. The pressure balancing fluid may comprise any substance or combination of substances which is capable of transmitting pressure through the interior space, including gases, liquids, and gels.

The pressure balancing fluid may comprise one or more dielectric substances which are capable of providing an electrical insulating function within the interior space. The pressure balancing fluid may comprise one or more vibration dampening substances which are capable of providing a shock absorbing function and/or an acoustic insulating function within the interior space. The pressure balancing fluid may comprise a gas or a combination of gases, including as non-limiting examples, air and/or an inert gas such as nitrogen. The pressure balancing fluid may comprise a liquid or a combination of liquids, including as non-limiting examples, an oil or a dielectric oil.

The transducer assembly may comprise a second transducer device mounted on or within the transducer housing. The second transducer device may comprise any type of sensor, transmitter, receiver, transceiver or similar structure, device or apparatus which may be used to sense, receive, and/or transmit data, information and/or signals.

The second transducer device may comprise an acoustic transmitter, an acoustic receiver, or an acoustic transceiver. The second transducer device may be used to determine properties of materials based upon the transmission of acoustic energy through the materials. The second transducer device may comprise a component of an acoustic logging apparatus or system.

The transducer housing may have a second transducer socket. The second transducer socket may be defined by the transducer housing. The second transducer socket may be in pressure communication with the interior space and/or with the exterior of the transducer housing.

The second transducer device may be mounted within the second transducer socket. The second transducer device may be mounted within the second transducer socket in any suitable manner. The second transducer device may be fixedly mounted within the second transducer socket so that the second transducer device does not move significantly or at all relative to the transducer housing when mounted within the second transducer socket. The second transducer device may be fixedly mounted within the second transducer socket in any suitable manner, and may be fixedly mounted within the second transducer socket either permanently or removably. The second transducer device may be fixedly mounted within the second transducer socket by being secured between shoulders in the second transducer socket and/or between suitable retaining devices.

The second transducer device may be sealingly mounted within the second transducer socket. The second transducer device may be sealingly mounted within the second transducer socket in any suitable manner. The transducer assembly may comprise a second transducer seal between the second transducer device and the transducer housing.

The second transducer device may have an interior side and an exterior side. The second transducer device may be mounted within the second transducer socket so that the interior side is adjacent to the interior space of the transducer housing and so that the exterior side is adjacent to the exterior of the transducer housing. The interior side of the second transducer device may be exposed to an interior space pressure within the interior space of the transducer housing. The exterior side of the second transducer device may be exposed to an exterior pressure at the exterior of the transducer housing.

The electronics assembly may be operatively connected with the second transducer device in order to enable the electronics assembly to communicate with the second transducer device. The electronics assembly may be operatively connected with the second transducer device in any suitable manner including, as non-limiting examples, with a wired electrical connection or with a wireless connection.

The transducer assembly may comprise a third transducer device mounted on or within the transducer housing. The third transducer device may comprise any type of sensor, transmitter, receiver, transceiver or similar structure, device or apparatus which may be used to sense, receive, and/or transmit data, information and/or signals.

The third transducer device may comprise an acoustic transmitter, an acoustic receiver, or an acoustic transceiver. The third transducer device may be used to determine properties of materials based upon the transmission of acoustic energy through the materials. The third transducer device may comprise a component of an acoustic logging apparatus or system.

The transducer housing may have a third transducer socket. The third transducer socket may be defined by the transducer housing. The third transducer socket may be in pressure communication with the interior space and/or with the exterior of the transducer housing.

The third transducer device may be mounted within the third transducer socket. The third transducer device may be mounted within the third transducer socket in any suitable manner. The third transducer device may be fixedly mounted within the third transducer socket so that the third transducer device does not move significantly or at all relative to the transducer housing when mounted within the third transducer socket. The third transducer device may be fixedly mounted within the third transducer socket in any suitable manner, and may be fixedly mounted within the third transducer socket either permanently or removably. The third transducer device may be fixedly mounted within the third transducer socket by being secured between shoulders in the third transducer socket and/or between suitable retaining devices.

The third transducer device may be sealingly mounted within the third transducer socket. The third transducer device may be sealingly mounted within the third transducer socket in any suitable manner. The transducer assembly may comprise a third transducer seal between the third transducer device and the transducer housing.

The third transducer device may have an interior side and an exterior side. The third transducer device may be mounted within the third transducer socket so that the interior side is adjacent to the interior space of the transducer housing and so that the exterior side is adjacent to the exterior of the transducer housing. The interior side of the third transducer device may be exposed to an interior space pressure within the interior space of the transducer housing. The exterior side of the third transducer device may be exposed to an exterior pressure at the exterior of the transducer housing.

The electronics assembly may be operatively connected with the third transducer device in order to enable the electronics assembly to communicate with the third transducer device. The electronics assembly may be operatively connected with the third transducer device in any suitable manner including, as non-limiting examples, with a wired electrical connection or with a wireless connection.

The transducer assembly may comprise a fourth transducer device mounted on or within the transducer housing. The fourth transducer device may comprise any type of sensor, transmitter, receiver, transceiver or similar structure, device or apparatus which may be used to sense, receive, and/or transmit data, information and/or signals.

The fourth transducer device may comprise an acoustic transmitter, an acoustic receiver, or an acoustic transceiver. The fourth transducer device may be used to determine properties of materials based upon the transmission of acoustic energy through the materials. The fourth transducer device may comprise a component of an acoustic logging apparatus or system.

The transducer housing may have a fourth transducer socket. The fourth transducer socket may be defined by the transducer housing. The fourth transducer socket may be in pressure communication with the interior space and/or with the exterior of the transducer housing.

The fourth transducer device may be mounted within the fourth transducer socket. The fourth transducer device may be mounted within the fourth transducer socket in any suitable manner. The fourth transducer device may be fixedly mounted within the fourth transducer socket so that the fourth transducer device does not move significantly or at all relative to the transducer housing when mounted within the fourth transducer socket. The fourth transducer device may be fixedly mounted within the fourth transducer socket in any suitable manner, and may be fixedly mounted within the fourth transducer socket either permanently or removably. The fourth transducer device may be fixedly mounted within the fourth transducer socket by being secured between shoulders in the fourth transducer socket and/or between suitable retaining devices.

The fourth transducer device may be sealingly mounted within the fourth transducer socket. The fourth transducer device may be sealingly mounted within the fourth transducer socket in any suitable manner. The transducer assembly may comprise a fourth transducer seal between the fourth transducer device and the transducer housing.

The fourth transducer device may have an interior side and an exterior side. The fourth transducer device may be mounted within the fourth transducer socket so that the interior side is adjacent to the interior space of the transducer housing and so that the exterior side is adjacent to the exterior of the transducer housing. The interior side of the fourth transducer device may be exposed to an interior space pressure within the interior space of the transducer housing. The exterior side of the fourth transducer device may be exposed to an exterior pressure at the exterior of the transducer housing.

The electronics assembly may be operatively connected with the fourth transducer device in order to enable the electronics assembly to communicate with the fourth transducer device. The electronics assembly may be operatively connected with the fourth transducer device in any suitable manner including, as non-limiting examples, with a wired electrical connection or with a wireless connection.

The transducer assembly may comprise a fifth transducer device mounted on or within the transducer housing. The fifth transducer device may comprise any type of sensor, transmitter, receiver, transceiver or similar structure, device or apparatus which may be used to sense, receive, and/or transmit data, information and/or signals.

The fifth transducer device may comprise an acoustic transmitter, an acoustic receiver, or an acoustic transceiver. The fifth transducer device may be used to determine properties of materials based upon the transmission of acoustic energy through the materials. The fifth transducer device may comprise a component of an acoustic logging apparatus or system.

The transducer housing may have a fifth transducer socket. The fifth transducer socket may be defined by the transducer housing. The fifth transducer socket may be in pressure communication with the interior space and/or with the exterior of the transducer housing.

The fifth transducer device may be mounted within the fifth transducer socket. The fifth transducer device may be mounted within the fifth transducer socket in any suitable manner. The fifth transducer device may be fixedly mounted within the fifth transducer socket so that the fifth transducer device does not move significantly or at all relative to the transducer housing when mounted within the fifth transducer socket. The fifth transducer device may be fixedly mounted within the fifth transducer socket in any suitable manner, and may be fixedly mounted within the fifth transducer socket either permanently or removably. The fifth transducer device may be fixedly mounted within the fifth transducer socket by being secured between shoulders in the fifth transducer socket and/or between suitable retaining devices.

The fifth transducer device may be sealingly mounted within the fifth transducer socket. The fifth transducer device may be sealingly mounted within the fifth transducer socket in any suitable manner. The transducer assembly may comprise a fifth transducer seal between the fifth transducer device and the transducer housing.

The fifth transducer device may have an interior side and an exterior side. The fifth transducer device may be mounted within the fifth transducer socket so that the interior side is adjacent to the interior space of the transducer housing and so that the exterior side is adjacent to the exterior of the transducer housing. The interior side of the fifth transducer device may be exposed to an interior space pressure within the interior space of the transducer housing. The exterior side of the fifth transducer device may be exposed to an exterior pressure at the exterior of the transducer housing.

The electronics assembly may be operatively connected with the fifth transducer device in order to enable the electronics assembly to communicate with the fifth transducer device. The electronics assembly may be operatively connected with the fifth transducer device in any suitable manner including, as non-limiting examples, with a wired electrical connection or with a wireless connection.

The transducer housing may have a second pressure balancing cylinder. The second pressure balancing cylinder may be defined by the transducer housing. The second pressure balancing cylinder may be in pressure communication with the interior space and/or with the exterior of the transducer housing.

The transducer assembly may comprise a second pressure balancing piston which is reciprocably mounted within the second pressure balancing cylinder. The second pressure balancing piston may be reciprocably mounted within the second pressure balancing cylinder in any manner which enables the second pressure balancing piston to reciprocate within the second pressure balancing cylinder while being retained within the second pressure balancing cylinder. The second pressure balancing piston may be retained within the second pressure balancing cylinder between shoulders in the second transducer socket and/or between suitable retaining devices.

The second pressure balancing piston may have an interior side and an exterior side. The second pressure balancing piston may be reciprocably mounted within the second pressure balancing cylinder so that the interior side of the second pressure balancing piston is exposed to the interior space pressure within the interior space of the transducer housing, and so that the exterior side of the second transducer device is exposed to an exterior pressure at the exterior of the transducer housing, with the result that the second pressure balancing piston reciprocates in response to pressure differences between the interior space and the exterior of the transducer housing.

The second pressure balancing piston may be sealingly mounted within the second pressure balancing cylinder. The second pressure balancing piston may be sealingly mounted within the second pressure balancing cylinder in any suitable manner. The transducer assembly may comprise a second piston seal between the second pressure balancing piston and the transducer housing. The second piston seal may comprise one or more seal elements.

In some circumstances, it may be advantageous to provide for a pressure differential between the interior space of the transducer housing and the exterior of the transducer housing. As a result, the second pressure balancing piston may be biased within the second pressure balancing cylinder to provide for such a pressure differential. The second pressure balancing piston may be biased within the second pressure balancing cylinder by using any suitable biasing device including, as a non-limiting example, a spring.

The assembly pressure balancing device may comprise the second pressure balancing cylinder and the second pressure balancing piston. The assembly pressure balancing device may comprise the first pressure balancing cylinder, the first pressure balancing piston, the second pressure balancing cylinder, and the second pressure balancing piston.

The first transducer socket may be located between the first pressure balancing cylinder and the second pressure balancing cylinder. The second transducer socket may be located between the first pressure balancing cylinder and the second pressure balancing cylinder. The third transducer socket may be located between the first pressure balancing cylinder and the second pressure balancing cylinder. The fourth transducer socket may be located between the first pressure balancing cylinder and the second pressure balancing cylinder. The fifth transducer socket may be located between the first pressure balancing cylinder and the second pressure balancing cylinder.

One or more transducer sockets and one or more pressure balancing cylinders may be arranged on the transducer housing substantially linearly. The transducer housing may be an elongated structure having a length greater than its width, and one or more transducer sockets and one or more pressure balancing cylinders may be arranged substantially linearly along the length of the transducer housing. The first pressure balancing cylinder may be located adjacent to a first end of the transducer housing, the second pressure balancing cylinder may be located adjacent to a second end of the transducer housing, and the transducer sockets may be arranged substantially linearly between the first pressure balancing cylinder and the second pressure balancing cylinder.

The transducer assembly may comprise fewer or more than five transducer sockets and five transducer devices. The assembly pressure balancing device may comprise fewer or more than two pressure balancing cylinders and two pressure balancing pistons. The transducer assembly may comprise more transducer sockets than transducer devices, with the result that one or more transducer sockets may not be occupied by a transducer device. Blank devices (i.e., not including transducers) may optionally be mounted in the extra transducer sockets in order to protect the transducer sockets.

If a transducer assembly comprises more than five transducer sockets and five transducer devices, the features and configuration of the additional transducer sockets and transducer devices may be selected in a manner similar to the first, second, third, fourth and fifth transducer sockets and the first, second, third, fourth and fifth transducer devices. If a transducer assembly comprises more than two pressure balancing cylinders and two pressure balancing pistons, the features and configuration of the additional pressure balancing cylinders and the additional pressure balancing pistons may be selected in a manner similar to the first and second pressure balancing cylinders and the first and second pressure balancing pistons.

The transducer assembly may be self-contained and/or used on its own, or the transducer assembly may be incorporated into a measurement tool. A measurement tool may comprise a single transducer assembly or may comprise a plurality of transducer assemblies.

A measurement tool may comprise a tool body. The tool body may comprise any structure, device or apparatus which is capable of supporting a transducer assembly. The tool body may be a unitary tool body or may comprise a plurality of tool body components.

The measurement tool may be configured to the insertable in a borehole. The measurement tool may be configured to function as a logging tool for use in data logging a borehole. The measurement tool may be configured to be deployed on a pipe string, a tubing string, a coiled tubing, a wireline, a slickline, or in any other suitable manner.

If the measurement tool is configured for use in data logging a borehole, the measurement tool may function only as a measurement tool, or the measurement tool may be dual purpose or multi-purpose. In addition to performing a measurement function, the measurement tool may function as a housing for another tool, as a drilling, completion, production or servicing tool, or as a component of a pipe string. As non-limiting examples, the tool body may be configured as a drill bit, as a stabilizer, or as a pipe such as a drill pipe, drill collar, tubing, coiled tubing, casing or liner.

The tool body may have one or any number of a plurality of mounting pockets. The mounting pockets may be located on an exterior surface of the tool body, on an interior surface of the tool body, or within the tool body. One or more of the mounting pockets may be configured to be compatible with a transducer assembly as described above so that one or more transducer assemblies can be mounted on the tool body. The mounting pockets may be substantially identical to each other or the tool body may have mounting pockets having different sizes and configurations.

The measurement tool may facilitate pressure balancing between transducer assemblies which are included in the measurement tool, so that a plurality of transducer assemblies may be in pressure communication with each other. Such pressure balancing may be facilitated in any manner which is capable of providing pressure communication between transducer assemblies. Such pressure balancing may be facilitated by a tool pressure balancing device. The tool pressure balancing device may comprise passages in the tool body. The tool pressure balancing device may comprise passages in the tool body and in the transducer housings.

The tool body may comprise one or more pressure balancing body passages. One or more pressure balancing body passages may extend between a pair of mounting pockets. The pressure balancing body passages may comprise any structure, device or apparatus which is capable of providing pressure communication between mounting pockets. A pressure balancing body passage may be defined by the tool body or may be a component of the tool body which is integrally formed with the tool body or which is connected or otherwise associated with the tool body.

A plurality of mounting pockets may be arranged on the tool body in any suitable configuration. As non-limiting examples, the mounting pockets may be arranged linearly or in a staggered configuration along a length of the tool body and/or may be arranged circumferentially at a common axial position or in a staggered configuration around the tool body.

A plurality of mounting pockets may be arranged circumferentially around the tool body. The mounting pockets may be spaced substantially equally around the circumference of the tool body. Four mounting pockets may be spaced substantially equally around the circumference of the tool body. One or more pressure balancing body passages may extend between each pair of adjacent mounting pockets so that the mounting pockets are in pressure communication with each other. At least one pressure balancing body passage may extend between adjacent mounting pockets at or adjacent to each of the opposite ends of the mounting pockets.

Transducer assemblies as described herein may be configured to be mounted within one or more of the mounting pockets in the tool body of a measurement tool. A transducer assembly may be mounted within a mounting pocket in any suitable manner. A transducer assembly may be retained within a mounting pocket with one or more bolts.

A transducer housing in a transducer assembly may comprise one or more pressure balancing housing passages extending between the interior space of the transducer housing and the exterior of the transducer housing, so that the exterior of the transducer housing is in pressure communication with the interior space of the transducer housing. The pressure balancing housing passages may comprise any structure, device or apparatus which is capable of providing pressure communication between the interior space of the transducer housing and the exterior of the transducer housing. A pressure balancing housing passage may be defined by the transducer housing or may be a component of the transducer housing which is integrally formed with the transducer housing or which is connected or otherwise associated with the transducer housing.

The pressure balancing body passages in the tool body and the pressure balancing housing passages in the transducer housings may be configured so that at least some of the pressure balancing body passages are in pressure communication with at least some of the pressure balancing housing passages when one or more transducer assemblies are mounted within the mounting pockets, so that the interior spaces of the transducer assemblies may be in pressure communication with at least some of the pressure balancing body passages and may thus be in pressure communication with each other.

One or more pressure balancing housing passages may extend between the interior space of a transducer housing and the exterior of a transducer housing at or adjacent to each of the opposite ends of the transducer housing, and may be in pressure communication with one or more pressure balancing body passages located at or adjacent to the ends of the mounting pockets when the transducer assembly is mounted within a mounting pocket, so that the interior space of the transducer assembly is in pressure communication with at least some of the pressure balancing body passages.

One or more pressure balancing housing passages may extend between the first pressure balancing cylinder in a transducer housing and the exterior of the transducer housing and one or more pressure balancing housing passages may extend between the second pressure balancing cylinder in the transducer housing and the exterior of the transducer housing, and may be in pressure communication with one or more pressure balancing body passages located at or adjacent to the ends of the mounting pockets when the transducer assembly is mounted within a mounting pocket, so that the interior space of the transducer assembly is in pressure communication with at least some of the pressure balancing body passages.

The measurement tool may comprise valves associated with one or more of the pressure balancing body passages, and/or the transducer assemblies may comprise valves associated with one or more of the pressure balancing housing passages. Such valves may be actuatable in any suitable manner to selectively open and close the pressure balancing body passages and/or the pressure balancing housing passages. The valves may be actuated automatically when the transducer assemblies are mounted within the mounting pockets upon engagement of the transducer housing with the tool body.

The mounting pockets may be configured so that assemblies other than transducer assemblies may be mounted within the mounting pockets. As a non-limiting example, the mounting pockets may be configured so that a blank assembly comprising a solid housing (i.e., not including transducer devices) may be mounted within the mounting pockets. A blank assembly may function to protect the mounting pocket, block the pressure balancing body passages, and provide additional structural strength to the measurement tool in circumstances where transducer assemblies are not required in all of the mounting pockets.

The mounting pockets and/or the assemblies may be configured so that the assemblies are sealingly mounted within the mounting pockets. The mounting pockets and/or the assemblies may comprise mounting seals. A purpose of the mounting seals may be to provide seals at the interfaces between the pressure balancing body passages and the pressure balancing housing passages. As a result, the mounting seals may comprise one or more seal elements for sealing the interfaces between the pressure balancing body passages and the pressure balancing housing passages.

FIGS. 1-7 depict non-limiting embodiments of a transducer assembly and of a measurement tool which comprises a plurality of transducer assemblies.

Figure 1:
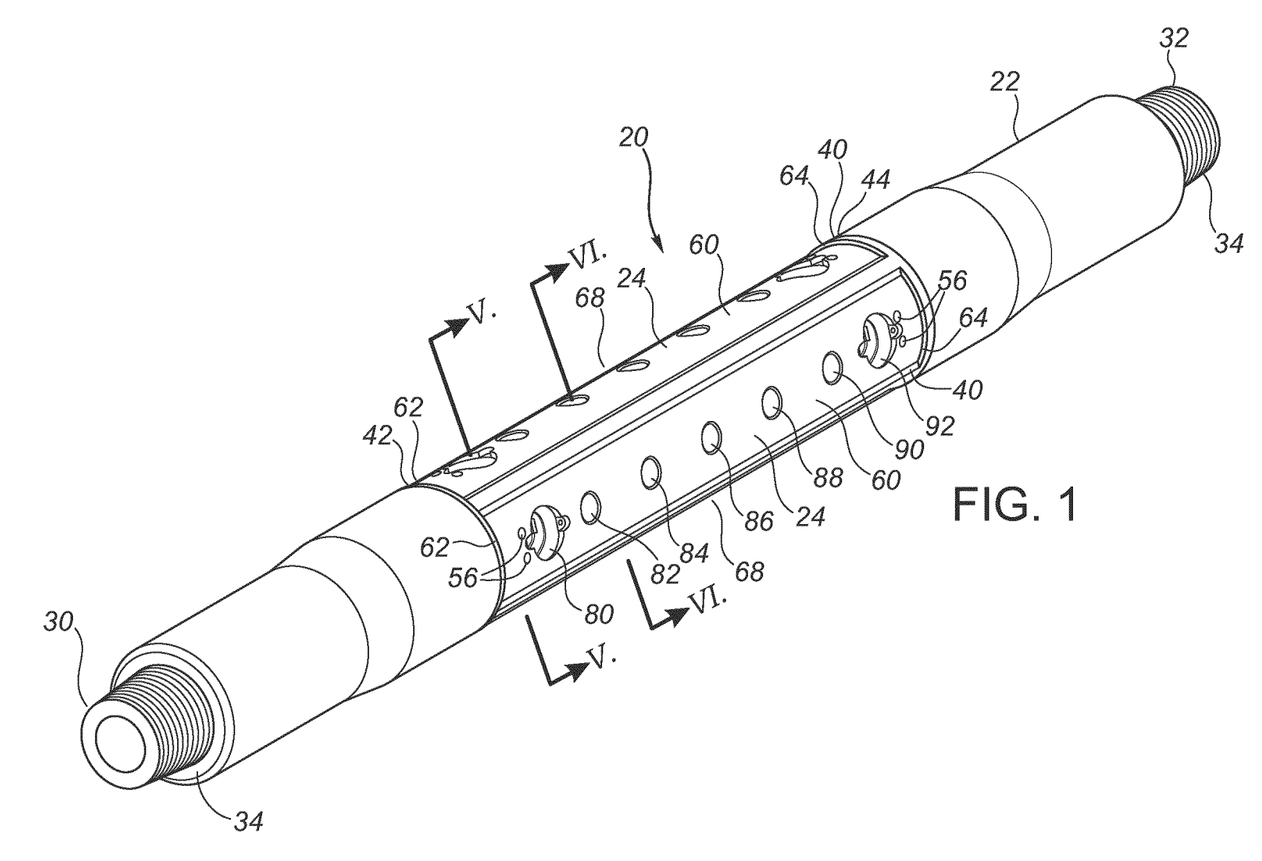
FIG. 1 is a pictorial view of an exemplary embodiment of a measurement tool which comprises a plurality of transducer assemblies.
Figure 2:
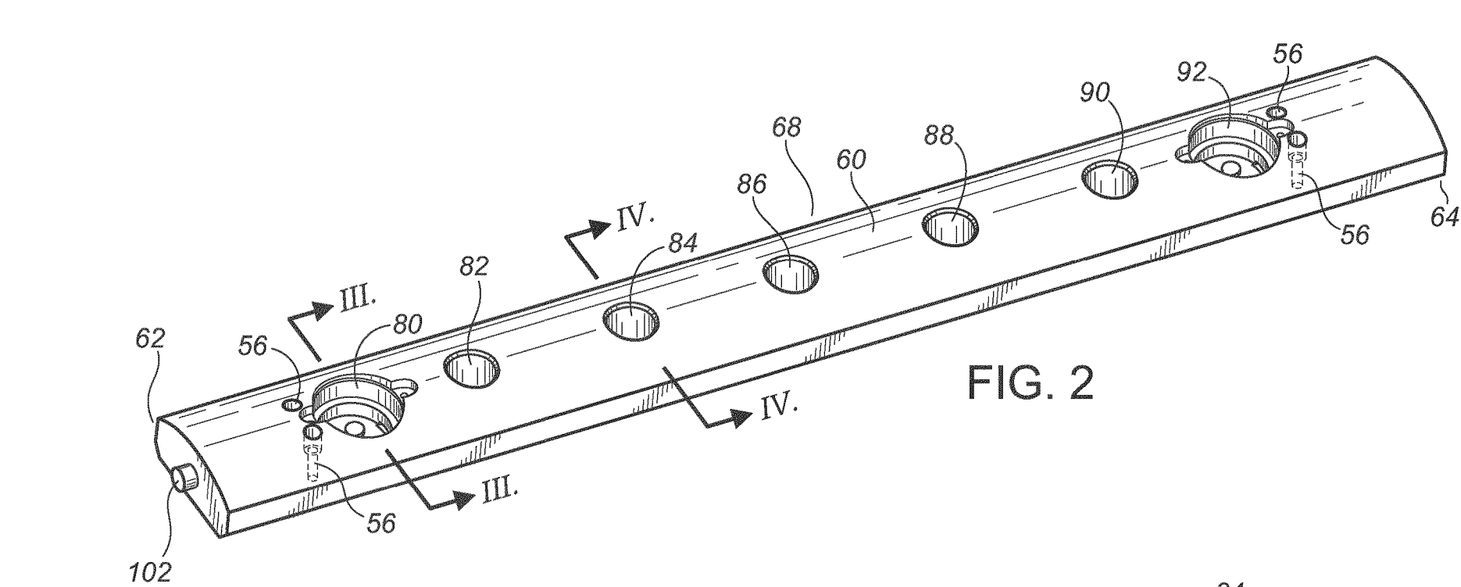
FIG. 2 is a pictorial view of a transducer housing in an exemplary embodiment of a transducer assembly.
Figure 3:
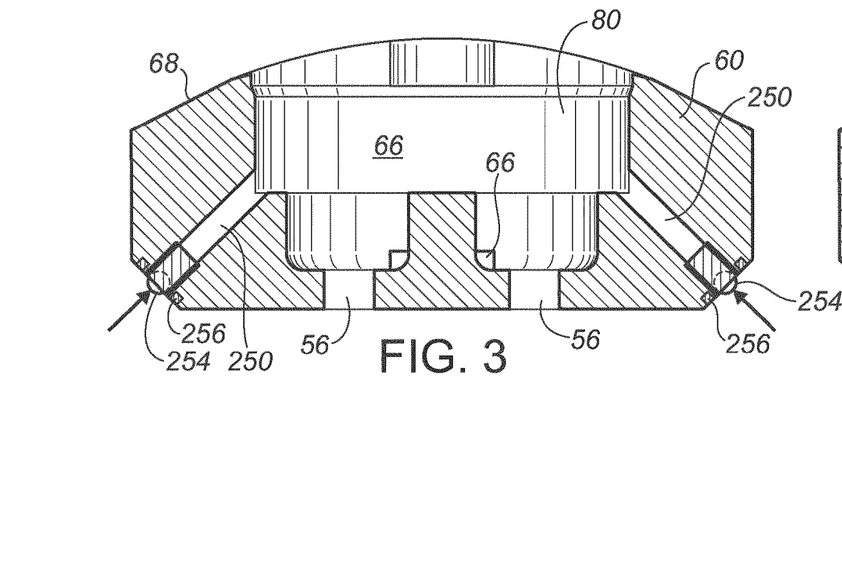
FIG. 3 is a transverse section view of the transducer housing of FIG. 2, taken along line 3-3 in FIG. 2.
Figure 4:
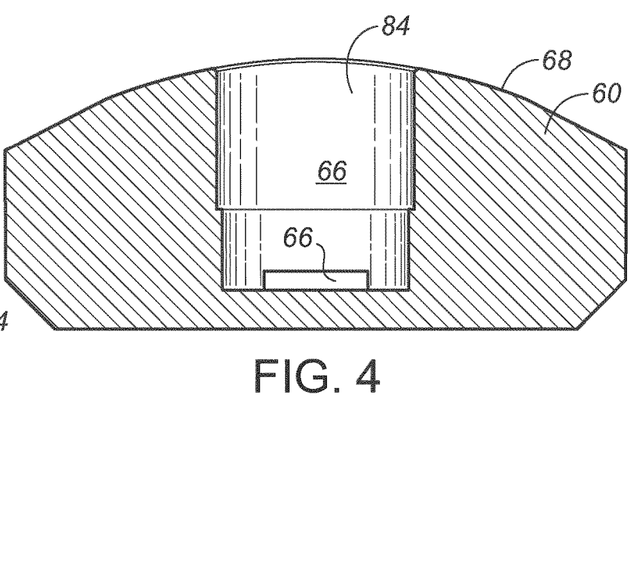
FIG. 4 is a transverse section view of the transducer housing of FIG. 2, taken along line 4-4 in FIG. 2.
Figure 5:
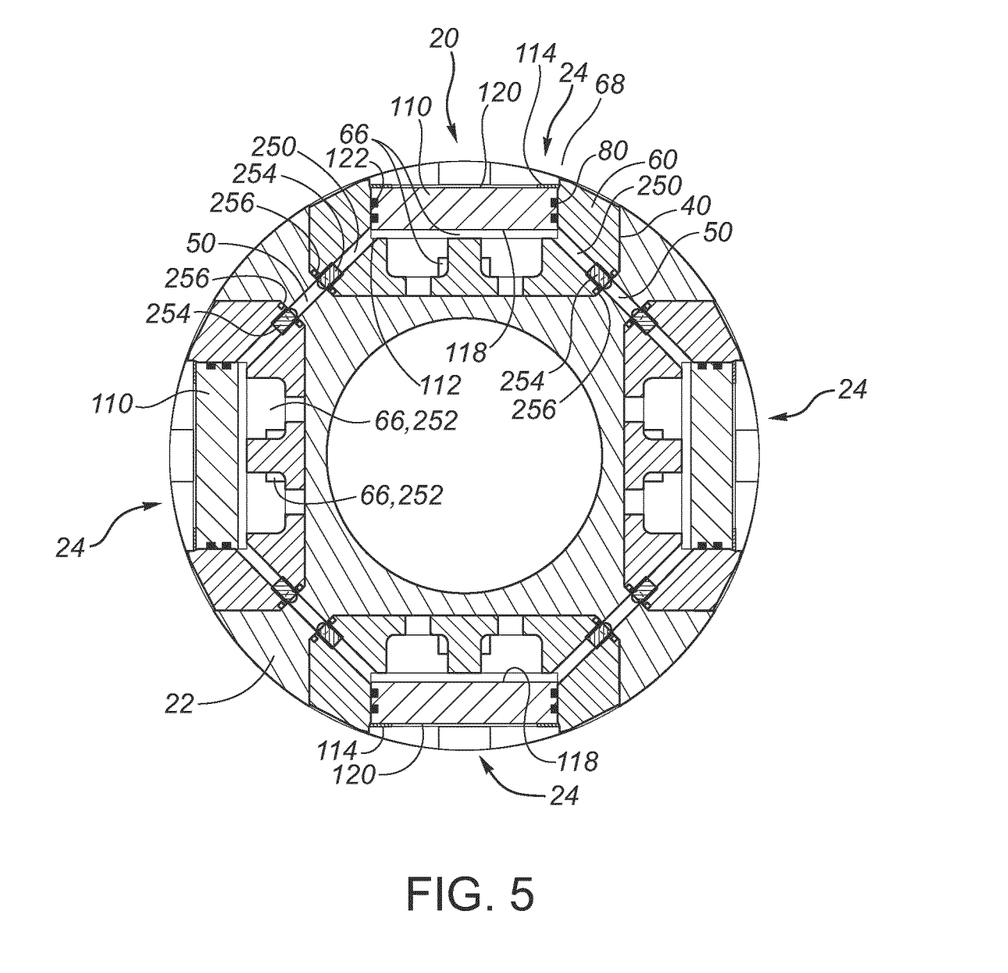
FIG. 5 is a transverse section view of the measurement tool of FIG. 1, taken along line 5-5 in FIG. 1.
Figure 6:
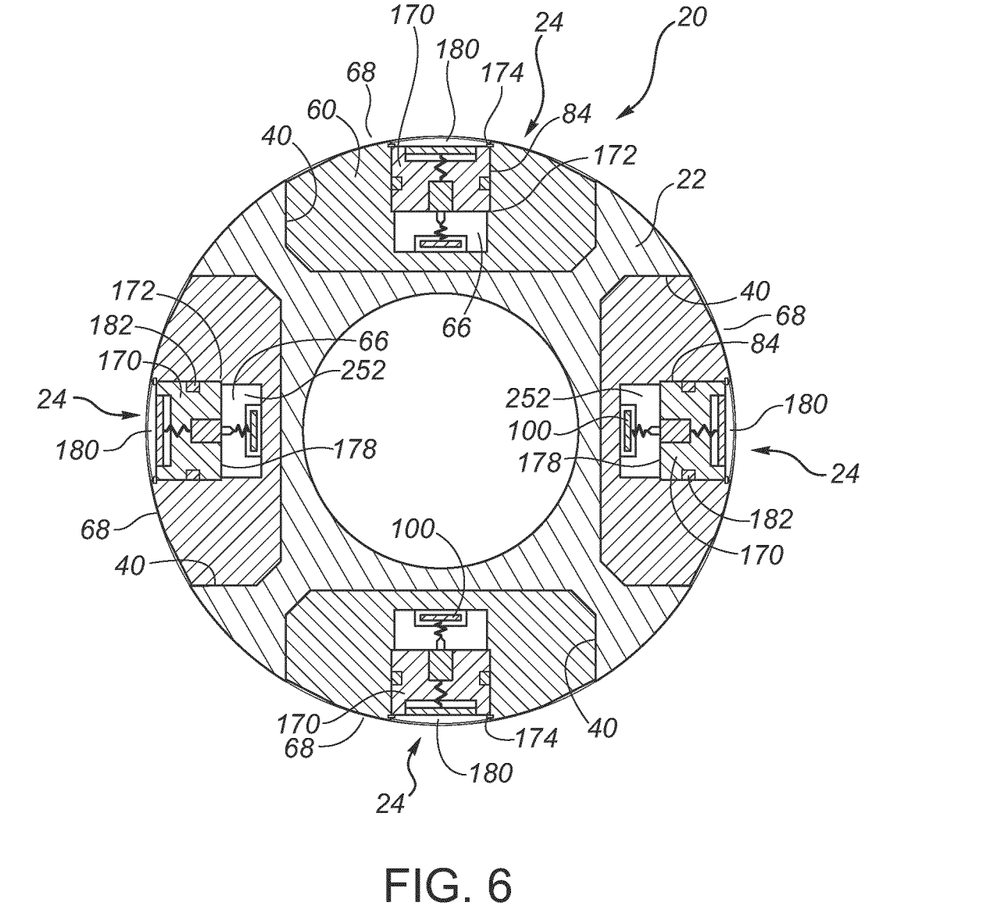
FIG. 6 is a transverse section view of the measurement tool of FIG. 1, taken along line 6-6 of FIG. 1.
Figure 7:
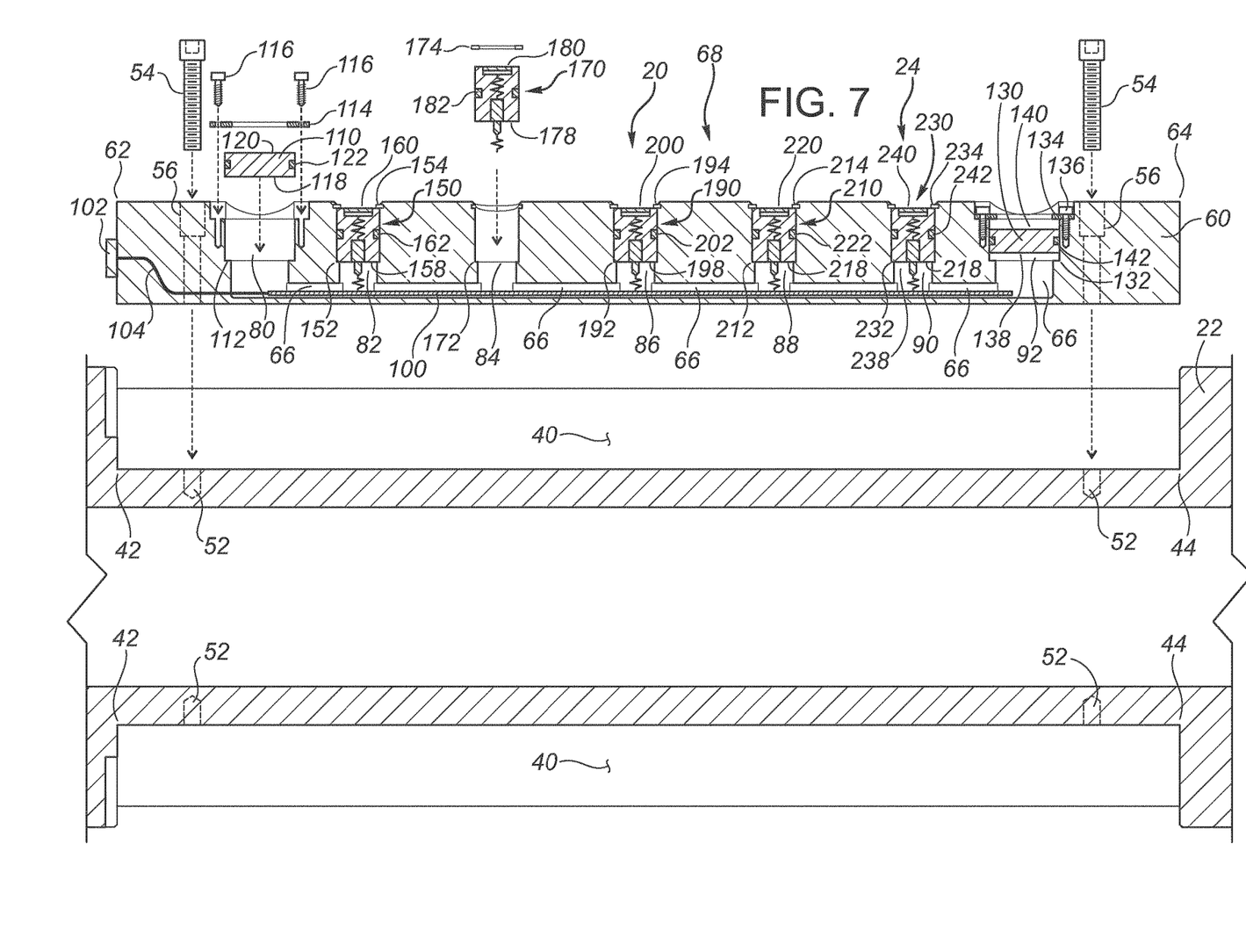
FIG. 7 is a partial longitudinal section assembly/exploded view of the measurement tool of FIG. 1 and the transducer assembly of FIG. 2.

More particularly, FIG. 1 and FIGS. 5-6 provide views of an assembled measurement tool. FIGS. 2-4 provide views of the transducer housing in one of the transducer assemblies in the measurement tool. FIG. 7 depicts portions of a partially assembled measurement tool.

FIGS. 1-7 are exemplary only. The features of the transducer assembly and of the measurement tool depicted in FIGS. 1-7 and described herein may be included in alternate designs and types of transducer assemblies and measurement tools.

Referring to FIG. 1 and FIGS. 5-6, in an exemplary embodiment, a measurement tool (20) comprises a tool body (22) and four transducer assemblies (24).

In the exemplary embodiment, the measurement tool (20) is insertable within a borehole (not shown) and is configured as a logging tool for use in data logging within a borehole. In the exemplary embodiment, the tool body (22) is a tubular collar or pipe having a central bore extending therethrough. In other embodiments, the tool body (22) may be configured as a component of another tool such as a drilling, logging, completion, production or servicing tool, including as non-limiting examples, a drill bit (not shown), as a stabilizer (not shown), or as a housing for another tool (not shown).

The tool body (22) has a first end (30) and a second end (32). One or both ends of the tool body (22) may be configured so that the measurement tool (20) can be connected with a pipe string (not shown). In the exemplary embodiment, both ends (30, 32) are configured so that the measurement tool (20) can be connected within a pipe string. More particularly, in the exemplary embodiment, a pin-type connector (34) is provided at both ends (30, 32) of the tool body (22) to facilitate connection with box-type connectors (not shown) in a pipe string. In other embodiments, one or both ends (30, 32) of the tool body (22) may include a box-type connector (not shown) or some other type of connector for connecting the measurement tool (20) within a pipe string.

In the exemplary embodiment, the tool body (22) has four mounting pockets (40) which are defined in an exterior surface of the tool body (22), only two of which are visible in FIG. 1. In other embodiments, the tool body (22) may have fewer or more mounting pockets (40). In the exemplary embodiment, each of the mounting pockets (40) is substantially identical. In other embodiments, the size, shape and configuration of the mounting pockets (40) may vary. In the exemplary embodiment, the mounting pockets (40) are spaced substantially equally around the circumference of the tool body (22) at the same axial position on the tool body (22). In other embodiments, the spacing and positioning of the mounting pockets (40) on the tool body (22) may be different from the exemplary embodiment.

The mounting pockets (40) each have a first end (42) and a second end (44). In the exemplary embodiment, the tool body (22) has a pressure balancing body passage (50) extending between each pair of adjacent mounting pockets (40) adjacent to each end (42, 44) of the mounting pockets (40). FIG. 5 depicts the pressure balancing body passages (50) extending between each pair of adjacent mounting pockets (40) adjacent to the first end (42) of the mounting pockets (40).

Referring to FIG. 5 and FIG. 7, in the exemplary embodiment, the tool body (22) has four threaded sockets (52) at the base of each of the mounting pockets (40), which facilitate mounting of the transducer assemblies (24) within the mounting pockets (40).

Referring to FIGS. 1-7, in the exemplary embodiment, the measurement tool (20) comprises a transducer assembly (24) mounted within each of the four mounting pockets (40). In other embodiments, a blank assembly (not shown) may be mounted within one or more of the mounting pockets (40). In the exemplary embodiment, the transducer assemblies (24) are retained within the mounting pockets (40) with bolts (54) which extend through transducer bores (56) in the transducer assemblies (24) and are threaded into the threaded sockets (52) at the bases of the mounting pockets (40) in the tool body (22).

In the exemplary embodiment, each of the four transducer assemblies (24) is substantially identical. In other embodiments, the size, shape and configuration of the transducer assemblies (24) which are included in the measurement tool (20) may vary.

In the exemplary embodiment, each transducer assembly (24) comprises a rigid transducer housing (60) constructed of steel, a steel alloy, or some other suitable material. The transducer housing (60) has a first end (62), a second end (64), an interior space (66) and an exterior (68). In the exemplary embodiment, the transducer housing (60) is elongate, having a length which is greater than its width.

In the exemplary embodiment, moving from the first end (62) to the second end (64) of the transducer housing (60), each transducer housing (60) has a first pressure balancing cylinder (80), a first transducer socket (82), a second transducer socket (84), a third transducer socket (86), a fourth transducer socket (88), a fifth transducer socket (90), and a second pressure balancing cylinder (92). In other embodiments, a transducer assembly (24) may comprise fewer or more pressure balancing cylinders and/or fewer or more transducer sockets.

The designation of the pressure balancing cylinders (80, 92) as first and second respectively, and the designation of the transducer sockets (82, 84, 86, 88, 90) as first, second, third, fourth, and fifth respectively is arbitrary, and is made only for the purpose of facilitating a clear description of the exemplary embodiment.

In the exemplary embodiment, the pressure balancing cylinders (80, 92) and the transducer sockets (82, 84, 86, 88, 90) extend linearly between the ends (62, 64) of the transducer housing (60), and the transducer sockets (82, 84, 86, 88, 90) are located between the pressure balancing cylinders (80, 92).

In the exemplary embodiment, the interior space (66) of each transducer housing (60) extends continuously between the first pressure balancing cylinder (80) and the second pressure balancing cylinder (92) and intersects both of the pressure balancing cylinders (80, 92) and each of the transducer sockets (82, 84, 86, 88, 90). As a result, in the exemplary embodiment, the pressure balancing cylinders (80, 92) and the transducer sockets (82, 84, 86, 88, 90) are in pressure communication with the interior space (66) and with the exterior (68) of the transducer housing (60).

In the exemplary embodiment, each transducer assembly (24) comprises an electronics assembly (100) which is contained within the interior space (66) of the transducer housing (60). Consequently, in the exemplary embodiment, the pressure balancing cylinders (80, 92), the transducer sockets (82, 84, 86, 88, 90) and the electronics assembly (100) are all in pressure communication with the interior space (66) and with each other.

In the exemplary embodiment, each transducer assembly (24) comprises an electrical connector (102) located at the exterior (68) of the transducer housing (60). The electrical connector (102) is operatively connected with the electronics assembly (100) via a cable (104) which extends between the electronics assembly (100) and the electrical connector (102). The electrical connector (102) facilitates communication with the electronics assembly (100) from the exterior (68) of the transducer assembly (24). In the exemplary embodiment, the electrical connector (102) may connect with a cable (not shown) or with another electrical connector (not shown) associated with the tool body (22).

In the exemplary embodiment, a first pressure balancing piston (110) is reciprocably mounted within the first pressure balancing cylinder (80), and is retained within the first pressure balancing cylinder (80) by a shoulder (112) in the first pressure balancing cylinder (80) and by a retaining ring (114) which is secured to the transducer housing (60) with screws (116). The distance between the shoulder (112) and the retaining ring (114) define the length of travel of the first pressure balancing piston (110) within the first pressure balancing cylinder (80).

The first pressure balancing piston (110) has an interior side (118) facing the interior space (66) and an exterior side (120) facing the exterior (68) of the transducer housing (60). In the exemplary embodiment, a first piston seal (122) is provided between the first pressure balancing piston (110) and the transducer housing (60). The first piston seal (122) separates the interior side (118) of the first pressure balancing piston (110) from the exterior side (120) of the first pressure balancing piston (110). The interior side (118) of the first pressure balancing piston (110) is exposed to an interior space pressure within the interior space (66), and the exterior side (120) of the first pressure balancing piston (110) is exposed to an exterior pressure at the exterior (68) of the transducer housing (60).

In the exemplary embodiment, a second pressure balancing piston (130) is reciprocably mounted within the second pressure balancing cylinder (92), and is retained within the second pressure balancing cylinder (92) by a shoulder (132) in the second pressure balancing cylinder (92) and by a retaining ring (134) which is secured to the transducer housing (60) with screws (136). The distance between the shoulder (132) and the retaining ring (134) define the length of travel of the second pressure balancing piston (130) within the second pressure balancing cylinder (92).

The second pressure balancing piston (130) has an interior side (138) facing the interior space (66) and an exterior side (140) facing the exterior (68) of the transducer housing (60). In the exemplary embodiment, a second piston seal (142) is provided between the second pressure balancing piston (130) and the transducer housing (60). The second piston seal (142) separates the interior side (138) of the second pressure balancing piston (130) from the exterior side (140) of the second pressure balancing piston (130). The interior side (138) of the second pressure balancing piston (130) is exposed to the interior space pressure within the interior space (66), and the exterior side (140) of the second pressure balancing piston (130) is exposed to the exterior pressure at the exterior (68) of the transducer housing (60).

In the exemplary embodiment of the measurement tool (20), each transducer assembly (24) comprises a transducer device mounted within each of the five transducer sockets (82, 84, 86, 88, 90). In other embodiments, a blank device (not shown) may be mounted within one or more of the transducer sockets (82, 84, 86, 88, 90).

In the exemplary embodiment, a first transducer device (150) is fixedly mounted within the first transducer socket (82), and is tightly retained within the first transducer socket (82) by a shoulder (152) in the first transducer socket (82) and by a retaining ring (154). In the exemplary embodiment, the first transducer device (140) is an acoustic transducer.

The first transducer device (150) has an interior side (158) facing the interior space (66) and an exterior side (160) facing the exterior (68) of the transducer housing (60). In the exemplary embodiment, a first transducer seal (162) is provided between the first transducer device (150) and the transducer housing (60). The first transducer seal (162) separates the interior side (158) of the first transducer device (150) from the exterior side (160) of the first transducer device (150). The interior side (158) of the first transducer device (150) is exposed to the interior space pressure within the interior space (66), and the exterior side (160) of the first transducer device (150) is exposed to the exterior pressure at the exterior (68) of the transducer housing (60).

In the exemplary embodiment, the electronics assembly (100) is operatively connected with the first transducer device (150) in order to enable the electronics assembly (100) to communicate with the first transducer device (150).

In the exemplary embodiment, a second transducer device (170) is fixedly mounted within the second transducer socket (84), and is tightly retained within the second transducer socket (84) by a shoulder (172) in the second transducer socket (84) and by a retaining ring (174). In the exemplary embodiment, the second transducer device (170) is an acoustic transducer.

The second transducer device (170) has an interior side (178) facing the interior space (66) and an exterior side (180) facing the exterior (68) of the transducer housing (60). In the exemplary embodiment, a second transducer seal (182) is provided between the second transducer device (170) and the transducer housing (60). The second transducer seal (182) separates the interior side (178) of the second transducer device (170) from the exterior side (180) of the second transducer device (170). The interior side (178) of the second transducer device (170) is exposed to the interior space pressure within the interior space (66), and the exterior side (180) of the second transducer device (170) is exposed to the exterior pressure at the exterior (68) of the transducer housing (60).

In the exemplary embodiment, the electronics assembly (100) is operatively connected with the second transducer device (170) in order to enable the electronics assembly (100) to communicate with the second transducer device (170).

In the exemplary embodiment, a third transducer device (190) is fixedly mounted within the third transducer socket (86), and is tightly retained within the third transducer socket (86) by a shoulder (192) in the third transducer socket (86) and by a retaining ring (194). In the exemplary embodiment, the third transducer device (190) is an acoustic transducer.

The third transducer device (190) has an interior side (198) facing the interior space (66) and an exterior side (200) facing the exterior (68) of the transducer housing (60). In the exemplary embodiment, a third transducer seal (202) is provided between the third transducer device (190) and the transducer housing (60). The third transducer seal (202) separates the interior side (198) of the third transducer device (190) from the exterior side (200) of the third transducer device (190). The interior side (198) of the third transducer device (190) is exposed to the interior space pressure within the interior space (66), and the exterior side (200) of the third transducer device (190) is exposed to the exterior pressure at the exterior (68) of the transducer housing (60).

In the exemplary embodiment, the electronics assembly (100) is operatively connected with the third transducer device (190) in order to enable the electronics assembly (100) to communicate with the third transducer device (190).

In the exemplary embodiment, a fourth transducer device (210) is fixedly mounted within the fourth transducer socket (88), and is tightly retained within the fourth transducer socket (88) by a shoulder (212) in the fourth transducer socket (88) and by a retaining ring (214). In the exemplary embodiment, the fourth transducer device (210) is an acoustic transducer.

The fourth transducer device (210) has an interior side (218) facing the interior space (66) and an exterior side (220) facing the exterior (68) of the transducer housing (60). In the exemplary embodiment, a fourth transducer seal (222) is provided between the fourth transducer device (210) and the transducer housing (60). The fourth transducer seal (222) separates the interior side (218) of the fourth transducer device (210) from the exterior side (220) of the fourth transducer device (210). The interior side (218) of the fourth transducer device (210) is exposed to the interior space pressure within the interior space (66), and the exterior side (220) of the fourth transducer device (210) is exposed to the exterior pressure at the exterior (68) of the transducer housing (60).

In the exemplary embodiment, the electronics assembly (100) is operatively connected with the fourth transducer device (210) in order to enable the electronics assembly (100) to communicate with the fourth transducer device (210).

In the exemplary embodiment, a fifth transducer device (230) is fixedly mounted within the fifth transducer socket (90), and is tightly retained within the fifth transducer socket (90) by a shoulder (232) in the fifth transducer socket (90) and by a retaining ring (234). In the exemplary embodiment, the fifth transducer device (230) is an acoustic transducer.

The fifth transducer device (230) has an interior side (238) facing the interior space (66) and an exterior side (240) facing the exterior (68) of the transducer housing (60). In the exemplary embodiment, a fifth transducer seal (242) is provided between the fifth transducer device (230) and the transducer housing (60). The fifth transducer seal (242) separates the interior side (238) of the fifth transducer device (230) from the exterior side (240) of the fifth transducer device (230). The interior side (238) of the fifth transducer device (230) is exposed to the interior space pressure within the interior space (66), and the exterior side (240) of the fifth transducer device (230) is exposed to the exterior pressure at the exterior (68) of the transducer housing (60).

In the exemplary embodiment, the electronics assembly (100) is operatively connected with the fifth transducer device (230) in order to enable the electronics assembly (100) to communicate with the fifth transducer device (230).

Referring to FIG. 3 and FIG. 7, in the exemplary embodiment of the measurement tool (20), each of the transducer assemblies (24) is configured to provide pressure communication amongst the four transducer assemblies (24) via the pressure balancing body passages (50) which are defined by the tool body (22).

More particularly, in the exemplary embodiment, each transducer housing (60) has two pressure balancing housing passages (250) extending between each of the pressure balancing cylinders (80, 92) and the exterior (68) of the transducer housing (60). Referring to FIG. 5, in the exemplary embodiment, the pressure balancing housing passages (250) are configured to connect with the pressure balancing body passages (50) when the transducer assembly (24) is mounted within a mounting pocket (40), so that the pressure balancing housing passages (250) and the pressure balancing body passages (50) are in pressure communication with each other, and so that the interior spaces (66) of the transducer housings (60) in the four transducer assemblies (24) are in pressure communication with each other.

In the exemplary embodiment of the measurement tool (20), a pressure balancing fluid (252) is contained within the interior spaces (66) of each of the transducer housings (60), within the pressure balancing housing passages (250) and within the pressure balancing body passages (50). In the exemplary embodiment, the pressure balancing fluid (252) is a suitable liquid.

In the exemplary embodiment, the transducer assemblies (24) comprise valves (254) positioned in each of the pressure balancing housing passages (250) which are configured to be closed when the transducer assemblies (24) are not mounted in the mounting pockets (40), and to be open when the transducer assemblies (24) are mounted in the mounting pockets (40). In the exemplary embodiment, the valves (254) are actuated automatically by engagement of the transducer housing (60) with the tool body (22) when the transducer assemblies (24) are inserted into the mounting pockets (40). The valves (254) may assist in minimizing leakage and/or contamination of the pressure balancing fluid (252).

In the exemplary embodiment, the transducer assemblies (24) are sealingly mounted within the mounting pockets (40). More particularly, in the exemplary embodiment, the transducer housing (60) is provided with mounting seals (256) surrounding the exterior end of the pressure balancing housing passages (250), to provide seals at the interfaces between the pressure balancing body passages (50) and the pressure balancing housing passages (250). The mounting seals (256) may assist in minimizing leakage and/or contamination of the pressure balancing fluid (252).

Referring to FIGS. 1-7, in the exemplary embodiment, the measurement tool (20) may be assembled in the following manner:

1. the transducer assemblies (24) may be assembled before being mounted in the mounting pockets (40) as follows:
   (a) the transducer devices (150, 170, 190, 210, 230) may be connected with the electronics assembly (100), inserted into the transducer sockets (82, 84, 86, 88, 90), and retained by the retaining rings (154, 174, 194, 214, 234). Blank devices may be mounted in one or more of the transducer sockets (82, 84, 86, 88, 90) if five transducer devices are not required;
   (b) one of the pressure balancing pistons (110, 130) may be inserted into its respective pressure balancing cylinder (80, 92), followed by its respective retaining ring (114, 134) and screws (116, 136);
   (c) the interior space (66) of the transducer housing (60) may be filled with the pressure balancing fluid (252) through the vacant pressure balancing cylinder (80, 92); and
   (d) the other of the pressure balancing pistons (110, 130) may be inserted into the vacant pressure balancing cylinder (80, 92), followed by its respective retaining ring (114, 134) and screws (116, 136);
2. the transducer assemblies (24) may be inserted into the mounting pockets (40) on the tool body (22) and may be secured within the mounting pockets (40) by extending the bolts (54) through the mounting bores (56) and threading the bolts (54) into the threaded sockets (52). Blank assemblies may be mounted in one or more of the mounting pockets (40) if four transducer assemblies are not required;
3. additional pressure balancing fluid (252) may be added to compensate for the pressure balancing fluid (252) which moves from the transducer assemblies (24) into the pressure balancing body passages (50) upon mounting of the transducer assemblies (24), by temporarily removing one of the pressure balancing pistons (110, 130) in one of the transducer assemblies (24), adding a suitable amount of the pressure balancing fluid (252), and then replacing the pressure balancing piston (110, 130);
4. the transducer assemblies (24) may be operatively connected with other tools or devices via the electrical connectors (102); and
5. the assembled measurement tool (20) may be connected with a pipe string to complete the assembly of the measurement tool (20).

The measurement tool (20) may be deployed for use in any suitable manner. If the measurement tool (20) is deployed in a borehole, the exteriors (68) of the transducer housings (60) will be exposed to borehole pressure as the exterior pressure. The borehole pressure will be transmitted to the interior spaces (66) of the transducer housings (60) as the interior space pressure by the assembly pressure balancing devices comprising the pressure balancing cylinders (80, 92) and the pressure balancing pistons (110, 130), so that both the interior sides (158, 178, 198, 218, 238) and the exterior sides (160, 180, 200, 220, 240) of the transducer devices (150, 170, 190, 210, 230) in each of the transducer assemblies (24) are exposed to the borehole pressure.

In order to provide for pressure balancing amongst the transducer assemblies (24) in the measurement tool (20), the interior space pressure within each of the transducer assemblies (24) may be transmitted amongst the interior spaces (66) by the tool pressure balancing device comprising the pressure balancing body passages (50) and the pressure balancing housing passages (250), which provides pressure communication amongst the interior spaces (66) of the transducer assemblies (24)

As a result, the interior sides (158, 178, 198, 218, 238) and the exterior sides (160, 180, 200, 220, 240) of each of the transducer devices (150, 170, 190, 210, 230) in each of the transducer assemblies (24) may be subjected to the same pressure, so that all of the transducer devices are operating under the same pressure conditions.

ADDITIONAL DISCLOSURES

The following are non-limiting, specific embodiments of the transducer assembly and the measurement tool described herein:

Embodiment A

A transducer assembly comprising:
a rigid transducer housing having an interior space, an exterior, and a first transducer socket and a first pressure balancing cylinder each in pressure communication with the interior space and with the exterior;
a first transducer device fixedly mounted within the first transducer socket and having an interior side exposed to an interior space pressure within the interior space of the transducer housing and an exterior side exposed to an exterior pressure at the exterior of the transducer housing;
a first pressure balancing piston reciprocably mounted within the first pressure balancing cylinder, the first pressure balancing piston having an interior side exposed to the interior space pressure and an exterior side exposed to the exterior pressure;
an electronics assembly within the interior space and operatively connected with the first transducer device; and
a pressure balancing fluid contained within the interior space.

Embodiment B

The transducer assembly of Embodiment A wherein the transducer housing has a plurality of pressure balancing housing passages extending between the interior space and the exterior.

Embodiment C

A measurement tool comprising:
a tool body, wherein the tool body has a plurality of mounting pockets, and wherein the tool body has one or more pressure balancing body passages extending between each pair of adjacent mounting pockets so that the mounting pockets are in pressure communication with each other; and
an assembly mounted in each of the mounting pockets, wherein at least two of the assemblies are transducer assemblies, and wherein each of the transducer assemblies comprises:
  a rigid transducer housing having an interior space, an exterior, and a first transducer socket and a first pressure balancing cylinder each in pressure communication with the interior space and with the exterior, wherein the transducer housing has one or more pressure balancing housing passages extending between the interior space and the exterior, and wherein at least some of the pressure balancing body passages are in pressure communication with each other so that the interior spaces of the transducer assemblies are in pressure communication with each other;
  a first transducer device fixedly mounted within the first transducer socket and having an interior side exposed to an interior space pressure within the interior space of the transducer housing and an exterior side exposed to an exterior pressure at the exterior of the transducer housing;
  a first pressure balancing piston reciprocably mounted within the first pressure balancing cylinder, the first pressure balancing piston having an interior side exposed to the interior space pressure and an exterior side exposed to the exterior pressure;
  an electronics assembly within the interior space and operatively connected with the first transducer device; and
  a pressure balancing fluid contained within the interior space.

Embodiment D

The transducer assembly or measurement tool of any one of Embodiments A through C wherein the transducer housing has a second transducer socket in pressure communication with the interior space and with the exterior, further comprising a second transducer device fixedly mounted within the second transducer socket, wherein the second transducer device has an interior side exposed to the interior space pressure and an exterior side exposed to the exterior pressure.

Embodiment E

The transducer assembly or measurement tool of Embodiment D wherein the transducer housing has a third transducer socket in pressure communication with the interior space and with the exterior, further comprising a third transducer device fixedly mounted within the third transducer socket, wherein the third transducer device has an interior side exposed to the interior space pressure and an exterior side exposed to the exterior pressure.

Embodiment F

The transducer assembly or measurement tool of any one of Embodiments A through E wherein the transducer housing has a second pressure balancing cylinder in pressure communication with the interior space and with the exterior, further comprising a second pressure balancing piston reciprocably mounted within the second pressure balancing cylinder, wherein the second pressure balancing piston has an interior side exposed to the interior space pressure and an exterior side exposed to the exterior pressure.

Embodiment G

The transducer assembly or measurement tool of Embodiment F wherein the first transducer socket is between the first pressure balancing cylinder and the second pressure balancing cylinder.

Embodiment H

The transducer assembly or measurement tool of any one of Embodiments F or G wherein the second transducer socket is between the first pressure balancing cylinder and the second pressure balancing cylinder.

Embodiment I

The transducer assembly or measurement tool of any one of Embodiments F through H wherein the third transducer socket is between the first pressure balancing cylinder and the second pressure balancing cylinder.

Embodiment J

The transducer assembly or measurement tool of any one of Embodiments F through I wherein the transducer housing has a plurality of pressure balancing housing passages extending between the first pressure balancing cylinder and the exterior, and wherein the transducer housing has a plurality of pressure balancing housing passages extending between the second pressure balancing cylinder and the exterior.

Embodiment K

The measurement tool of any one of Embodiments C through J wherein the measurement tool is insertable in a borehole.

Embodiment L

The measurement tool of any one of Embodiments C through K wherein the measurement tool is a logging tool for use in data logging within a borehole.

Embodiment M

The measurement tool of any one of Embodiments C through L wherein the tool body is selected from the group of tool bodies consisting of a pipe and a stabilizer.

Embodiment N

The transducer assembly or measurement tool of any one of Embodiments A through M, further comprising a first transducer seal between the first transducer device and the transducer housing.

Embodiment O

The transducer assembly or measurement tool of any one of Embodiments D through N, further comprising a second transducer seal between the second transducer device and the transducer housing.

Embodiment P

The transducer assembly or measurement tool of any one of Embodiments E through N, further comprising a third transducer seal between the third transducer device and the transducer housing.

Embodiment Q

The transducer assembly or measurement tool of any one of Embodiments D through P wherein the electronics assembly is operatively connected with the second transducer device.

Embodiment R

The transducer assembly or measurement tool of any one of Embodiments E through Q wherein the electronics assembly is operatively connected with the third transducer device.

Embodiment S

The transducer assembly or measurement tool of any one of Embodiments A through R, further comprising an electrical connector at the exterior of the transducer housing, wherein the electrical connector is operatively connected with the electronics assembly.

Embodiment T

The transducer assembly or measurement tool of any one of Embodiments A through S wherein the pressure balancing fluid comprises a liquid.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

We claim:
1. A transducer assembly comprising:
  a rigid transducer housing having an interior space, an exterior, and a first transducer socket and a first pressure balancing cylinder each in pressure communication with the interior space and with the exterior;
  a first transducer device fixedly mounted within the first transducer socket and having an interior side exposed to an interior space pressure within the interior space of the transducer housing and an exterior side exposed to an exterior pressure at the exterior of the transducer housing;
  a first pressure balancing piston reciprocably mounted within the first pressure balancing cylinder, the first pressure balancing piston having an interior side exposed to the interior space pressure and an exterior side exposed to the exterior pressure;
  an electronics assembly within the interior space and operatively connected with the first transducer device; and
  a pressure balancing fluid contained within the interior space.

2. The transducer assembly as claimed in claim 1 wherein the pressure balancing fluid comprises a liquid.

3. The transducer assembly as claimed in claim 1, further comprising a first transducer seal between the first transducer device and the transducer housing.

4. The transducer assembly as claimed in claim 1 wherein the transducer housing has a second transducer socket in pressure communication with the interior space and with the exterior, further comprising a second transducer device fixedly mounted within the second transducer socket, the second transducer device having an interior side exposed to the interior space pressure and an exterior side exposed to the exterior pressure.

5. The transducer assembly as claimed in claim 4, further comprising a first transducer seal between the first transducer device and the transducer housing, and further comprising a second transducer seal between the second transducer device and the transducer housing.

6. The transducer assembly as claimed in claim 4 wherein the electronics assembly is operatively connected with the second transducer device.

7. The transducer assembly as claimed in claim 4 wherein the transducer housing has a third transducer socket in pressure communication with the interior space and with the exterior, further comprising a third transducer device fixedly mounted within the third transducer socket, the third transducer device having an interior side exposed to the interior space pressure and an exterior side exposed to the exterior pressure.

8. The transducer assembly as claimed in claim 7, further comprising a first transducer seal between the first transducer device and the transducer housing, further comprising a second transducer seal between the second transducer device and the transducer housing, and further comprising a third transducer seal between the third transducer device and the transducer housing.

9. The transducer assembly as claimed in claim 7 wherein the electronics assembly is operatively connected with the second transducer device and the third transducer device.

10. The transducer assembly as claimed in claim 1 wherein the transducer housing has a second pressure balancing cylinder in pressure communication with the interior space and with the exterior, further comprising a second pressure balancing piston reciprocably mounted within the second pressure balancing cylinder, the second pressure balancing piston having an interior side exposed to the interior space pressure and an exterior side exposed to the exterior pressure.

11. The transducer assembly as claimed in claim 10 wherein the first transducer socket is between the first pressure balancing cylinder and the second pressure balancing cylinder.

12. The transducer assembly as claimed in claim 11 wherein the transducer housing has a second transducer socket in pressure communication with the interior space and with the exterior, further comprising a second transducer device fixedly mounted within the second transducer socket, the second transducer device having an interior side exposed to the interior space pressure and an exterior side exposed to the exterior pressure, wherein the second transducer socket is between the first pressure balancing cylinder and the second pressure balancing cylinder.

13. The transducer assembly as claimed in claim 12 wherein the transducer housing has a third transducer socket in pressure communication with the interior space and with the exterior, further comprising a third transducer device fixedly mounted within the third transducer socket, the third transducer device having an interior side exposed to the interior space pressure and an exterior side exposed to the exterior pressure, wherein the third transducer socket is between the first pressure balancing cylinder and the second pressure balancing cylinder.

14. The transducer assembly as claimed in claim 13, further comprising an electrical connector at the exterior of the transducer housing and operatively connected with the electronics assembly.

15. The transducer assembly as claimed in claim 1 wherein the transducer housing defines a plurality of pressure balancing housing passages extending between the interior space and the exterior.

16. The transducer assembly as claimed in claim 10 wherein the transducer housing defines a plurality of pressure balancing housing passages extending between the first pressure balancing cylinder and the exterior, and wherein the transducer housing defines a plurality of pressure balancing housing passages extending between the second pressure balancing cylinder and the exterior.

17. A measurement tool comprising:
a tool body, wherein the tool body has a plurality of mounting pockets, and wherein the tool body has one or more pressure balancing body passages extending between each pair of adjacent mounting pockets so that the mounting pockets are in pressure communication with each other; and
an assembly mounted in each of the mounting pockets, wherein at least two of the assemblies are transducer assemblies, and wherein each of the transducer assemblies comprises:
a rigid transducer housing having an interior space, an exterior, and a first transducer socket and a first pressure balancing cylinder each in pressure communication with the interior space and with the exterior, wherein the transducer housing has one or more pressure balancing housing passages extending between the interior space and the exterior, and wherein at least some of the pressure balancing body passages are in pressure communication with each other so that the interior spaces of the transducer assemblies are in pressure communication with each other;
a first transducer device fixedly mounted within the first transducer socket and having an interior side exposed to an interior space pressure within the interior space of the transducer housing and an exterior side exposed to an exterior pressure at the exterior of the transducer housing;
a first pressure balancing piston reciprocably mounted within the first pressure balancing cylinder, the first pressure balancing piston having an interior side exposed to the interior space pressure and an exterior side exposed to the exterior pressure;
an electronics assembly within the interior space and operatively connected with the first transducer device; and
a pressure balancing fluid contained within the interior space.

18. The measurement tool as claimed in claim 17 wherein the measurement tool is insertable in a borehole.

19. The measurement tool as claimed in claim 17 wherein the measurement tool is a logging tool for use in data logging within a borehole.

20. The measurement tool as claimed in claim 17 wherein the tool body is selected from the group of tool bodies consisting of a pipe and a stabilizer.

* * * * *